United States Patent
Kahng et al.

(10) Patent No.: US 9,173,129 B2
(45) Date of Patent: Oct. 27, 2015

(54) IPV6 ADDRESS MANAGEMENT METHOD AND GATEWAY PERFORMING THE SAME

(71) Applicant: Intellectual Discovery Co., Ltd., Seoul (KR)

(72) Inventors: Hyun Kook Kahng, Seoul (KR); Dae In Choi, Suwon-si (KR); Jong Tak Park, Seosan-si (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 277 days.

(21) Appl. No.: 13/867,365

(22) Filed: Apr. 22, 2013

(65) Prior Publication Data

US 2013/0235862 A1    Sep. 12, 2013

Related U.S. Application Data

(63) Continuation of application No. PCT/KR2011/007830, filed on Oct. 20, 2011.

(30) Foreign Application Priority Data

Oct. 22, 2010 (KR) .................. 10-2010-0103305

(51) Int. Cl.
*H04W 28/06* (2009.01)
*H04L 29/06* (2006.01)
*H04L 12/741* (2013.01)
*H04L 29/12* (2006.01)

(52) U.S. Cl.
CPC ............. *H04W 28/06* (2013.01); *H04L 61/103* (2013.01); *H04L 61/6072* (2013.01); *H04L 69/04* (2013.01); *H04L 45/745* (2013.01); *H04L 61/6022* (2013.01); *H04L 61/6059* (2013.01)

(58) Field of Classification Search
None
See application file for complete search history.

(56) References Cited

U.S. PATENT DOCUMENTS

| | | | |
|---|---|---|---|
| 2004/0139187 A1* | 7/2004 | Park | 709/223 |
| 2009/0141741 A1* | 6/2009 | Kim et al. | 370/474 |
| 2009/0146833 A1* | 6/2009 | Lee et al. | 340/825.52 |
| 2009/0185549 A1* | 7/2009 | Shon et al. | 370/349 |
| 2011/0176469 A1* | 7/2011 | Kim et al. | 370/311 |

FOREIGN PATENT DOCUMENTS

| | | |
|---|---|---|
| KR | 10-2007-0008436 A | 1/2007 |
| KR | 10-2008-0093843 A | 10/2008 |
| KR | 10-0899809 B1 | 5/2009 |
| KR | 10-2010-0105086 A | 9/2010 |

OTHER PUBLICATIONS

International Search Report for PCT/KR2011/007830 dated Apr. 23, 2012.
Mei, et al., "Improvement of EUI-64 Interface ID in Stateless Address Autoconfiguration Protocol", Microcomputer Information, vol. 24, No. 33, pp. 201-203, Nov. 25, 2008.

* cited by examiner

*Primary Examiner* — Marcus R Smith
(74) *Attorney, Agent, or Firm* — Pearne & Gordon LLP

(57) ABSTRACT

A management method for an IPv6 address for use in a gateway is provided. The method includes receiving a packet including an IPv6 address, extracting a MAC address from the IPv6 address of the packet, generating a compressed address by inserting a previously defined bit sequence into the MAC address, and storing the compressed address and the IPv6 address in a mapping table. The packet is received from a WPAN (Wireless Personal Area Network) node.

14 Claims, 12 Drawing Sheets

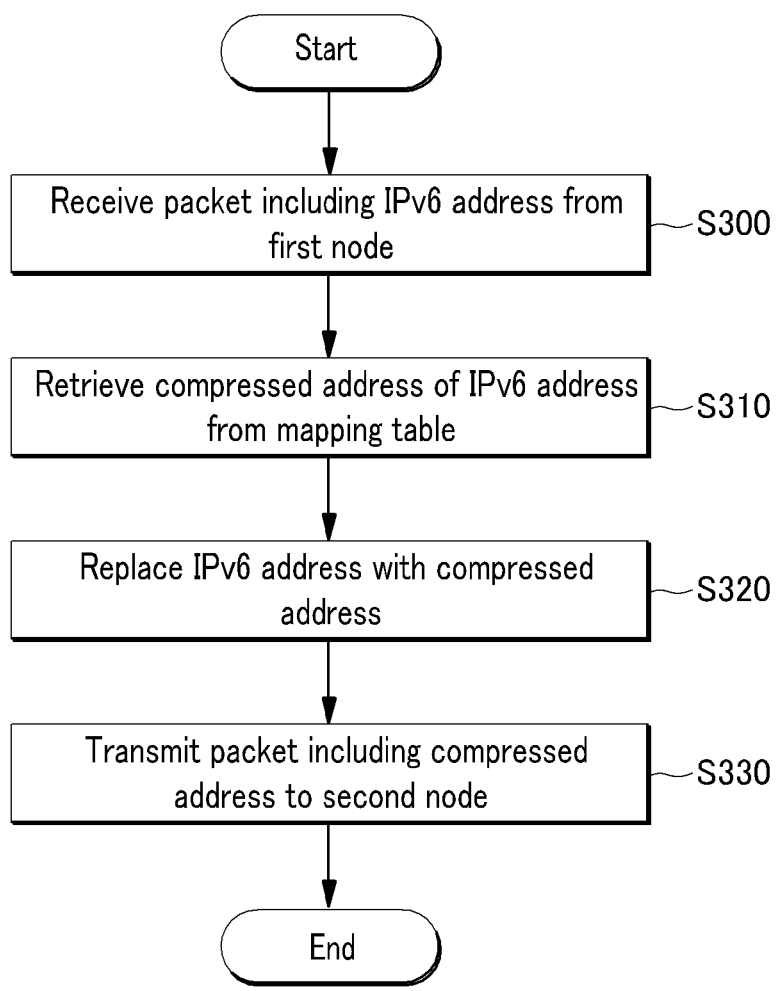

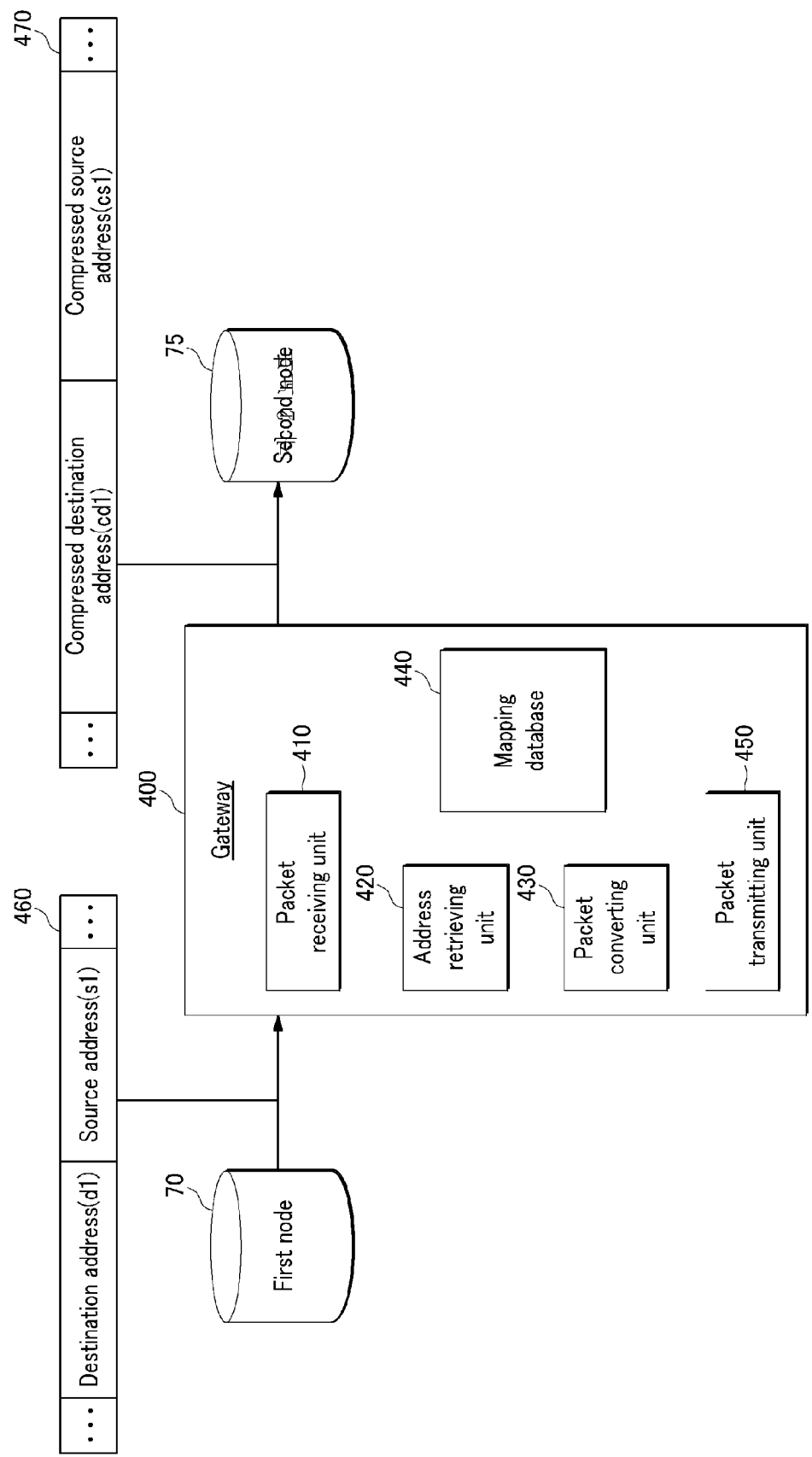

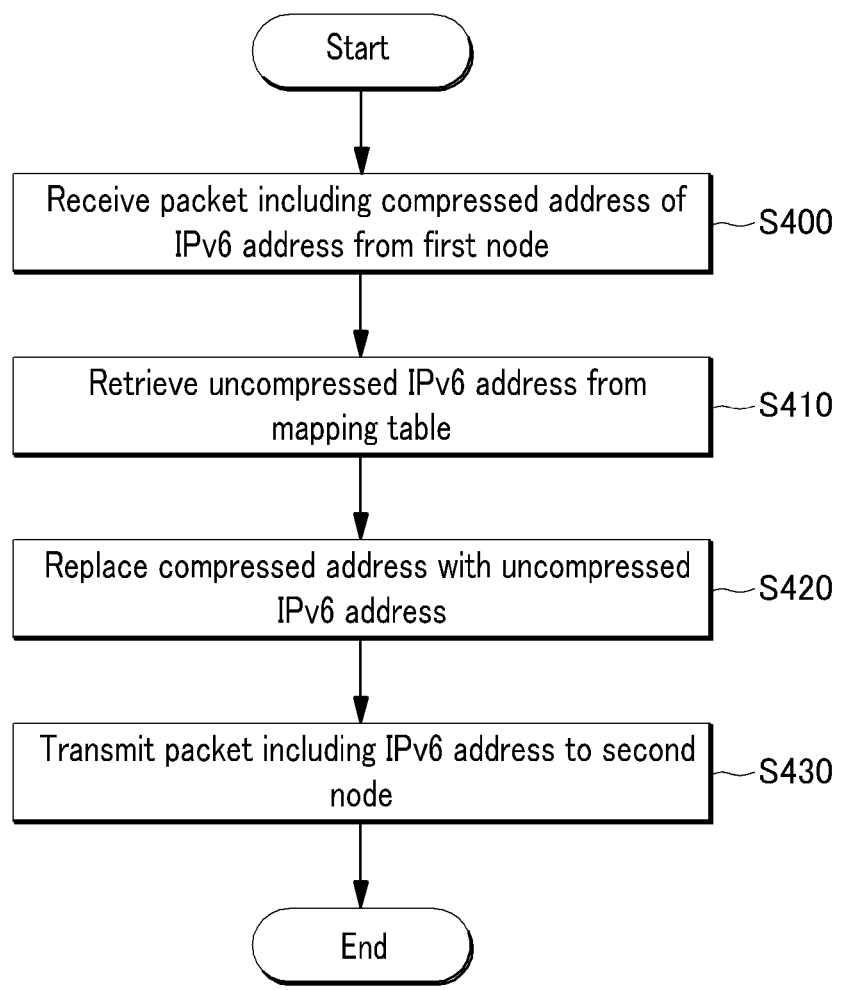

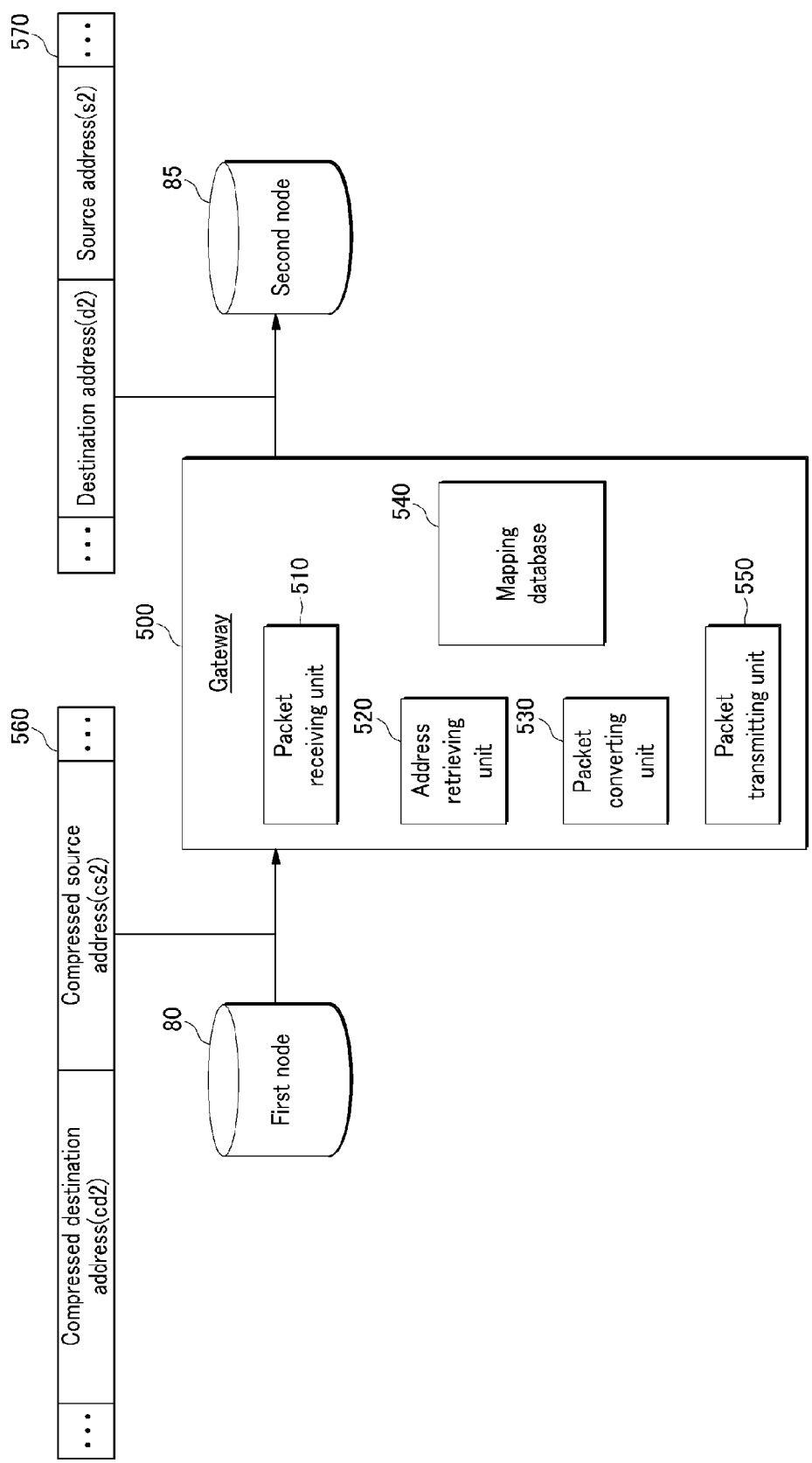

_US 9,173,129 B2_

IPV6 ADDRESS MANAGEMENT METHOD AND GATEWAY PERFORMING THE SAME

CROSS-REFERENCE TO RELATED APPLICATIONS

This application is a continuation application of International Application No. PCT/KR2011/007830, filed on Oct. 20, 2011, which claims priority to Korean Application KR 10/2010-0103305, filed on Oct. 22, 2010, the entire disclosures of which are hereby incorporated herein by reference.

TECHNICAL FIELD

The present disclosure relates to an IPv6 address management method and a gateway performing the same.

BACKGROUND ART

A wireless personal area network (WPAN) realizes a personal area network (PAN) in a wireless way. As a representative WPAN, there is known a wireless sensor network (WSN). WSN is a core technology as a basis of a ubiquitous network and has wide applications in various fields such as environment monitoring, medical systems, telematics, home networks, and logistics systems. Zigbee, which defines standards of upper layers including network layers based on the IEEE 802 15.4 MAC/PHY standard which is a standard technology applied to WSN, is designed to maintain low power consumption and low speed characteristics of IEEE 802.15.4.

Zigbee has a network layer based on non-IP, which does not directly interwork with an IP network. A Zigbee protocol method is inefficient because in order to communicate with an IP network, packets should be collected through certain collecting equipment and reprocessed in an application layer. If a sensor node in a terminal has an IP address, the sensor node can be individually accessed and naturally integrated with the most broadly constructed IP network. That is, without a collecting device or a relay device at an intermediate point, direct one-to-one communication becomes possible. As a technology for allowing interworking the WPAN and an external network to interact with each other by utilizing IPv6, there is known an IPv6 over low power wireless personal area network (6LoWPAN) of which standardization has been studied by the 6LoWPAN Working Group.

FIG. 1 illustrates a conceptual diagram of a network in which 6LoWPAN is implemented in accordance with a conventional technology.

With reference to FIG. 1, WPAN 10 is connected to an external IP network 20 via a gateway 30. In addition, IP communication is accomplished between a host existing on the IP network 20 and a device existing on the WPAN 10 based on Internet protocol. That is, on the network in which the 6LowPAN is implemented, if an IPv6 address is informed, a packet can be directly transmitted and received between an external host and an internal WPAN 10 node without needing to perform a conversion process of a communication protocol such as Zigbee.

In order to implement such a network, a node of the WPAN 10 has an IPv6 address. In order to generate an IPv6 address of a node, there is employed a method using an extended unique identifier (EUI)-64. An IPv6 address generated by EUI-64 is globally unique and can provide a mobile support between the WPAN 10 and the IP network 20.

However, the WPAN 10, in which PHY/MAC layers are defined by IEEE 802.15.4, uses small-sized packets. In consideration of the maximum size of information unit used by PHY/MAC in the WPAN 10, an IPv6/TCP or IPv6/UDP header and application data should be expressed within 80 bytes. As a result, in order to store as much data as possible in a single packet, the IPv6 packet header needs to be compressed.

DISCLOSURE OF THE INVENTION

Problems to be Solved by the Invention

In view of the foregoing problems, the present disclosure provides an IPv6 address management method for reducing overhead of a header in communications between WPAN and an IP network, and also provides a gateway performing the IPv6 address management method.

Means for Solving the Problems

In accordance with a first aspect of an illustrative embodiment, there is provided a management method for an IPv6 address for use in a gateway. The method includes receiving a packet including an IPv6 address; extracting a MAC address from the IPv6 address of the packet; generating a compressed address by inserting a previously defined bit sequence into the MAC address; and storing the compressed address and the IPv6 address in a mapping table. The packet is received from a WPAN (Wireless Personal Area Network) node.

In accordance with a second aspect of the illustrative embodiment, there is provided a management method for an IPv6 address for use in a gateway. The method includes receiving a packet including an IPv6 address from a node; retrieving a compressed address of the IPv6 address from a previously stored mapping table; and transmitting a packet including the compressed address to the node, wherein the compressed address is generated by extracting a MAC address from the IPv6 address and inserting a previously defined bit sequence into the MAC address. The packet is received from a WPAN (Wireless Personal Area Network) node.

In accordance with a third aspect of the illustrative embodiment, there is provided a management method for an IPv6 address for use in a gateway. The method includes receiving a packet including an IPv6 address from a first node; retrieving a compressed address of the IPv6 address from a previously stored mapping table; replacing the IPv6 address in the packet with the compressed address; and transmitting the packet including the compressed address to a second node, wherein the compressed address is generated by extracting a MAC address from the IPv6 address and inserting a previously defined bit sequence into the MAC address. The second node is a WPAN node.

In accordance with a fourth aspect of the illustrative embodiment, there is provided a management method for an IPv6 address for use in a gateway. The method includes receiving a packet including a compressed address of an IPv6 address from a first node; retrieving, from a previously stored mapping table, the uncompressed IPv6 address of the compressed address; replacing the compressed address in the packet with the uncompressed IPv6 address; and transmitting the packet including the uncompressed IPv6 address to a second node, wherein the compressed address is generated by extracting a MAC address from the IPv6 address and inserting a previously defined bit sequence into the MAC address. The first node is a WPAN node.

In accordance with a fifth aspect of the illustrative embodiment, there is provided a gateway that includes a packet receiving unit configured to receive a packet including an IPv6 address; a compressed address generating unit configured to extract a MAC address from the IPv6 address of the packet and generate a compressed address by inserting a previously defined bit sequence into the MAC address; and a mapping database that stores the IPv6 address and the compressed address. The packet receiving unit receives the packet from a WPAN (Wireless Personal Area Network) node.

In accordance with a sixth aspect of the illustrative embodiment, there is provided a gateway that includes a packet receiving unit configured to receive a packet including an IPv6 address from a node; an address retrieving unit configured to retrieve a compressed address of the IPv6 address; a packet transmitting unit configured to transmit a packet including the compressed address to the node; and a mapping database that stores the IPv6 address and the compressed address, wherein the compressed address is generated by extracting a MAC address from the IPv6 address and inserting a previously defined bit sequence into the MAC address. The packet receiving unit receives the packet from a WPAN (Wireless Personal Area Network) node.

In accordance with a seventh aspect of the illustrative embodiment, there is provided a gateway that includes a packet receiving unit configured to receive a packet including an IPv6 address from a first node; an address retrieving unit configured to retrieve a compressed address of the IPv6 address; a packet converting unit configured replace the IPv6 address in the packet with the compressed address; a packet transmitting unit configured to transmit the packet including the compressed address to a second node; and a mapping database that stores the IPv6 address and the compressed address, wherein the compressed address is generated by extracting a MAC address from the IPv6 address and inserting a previously defined bit sequence into the MAC address. The second node is a WPAN node.

In accordance with an eighth aspect of the illustrative embodiment, there is provided a gateway that includes a packet receiving unit configured to receive a packet including a compressed address of an IPv6 address from a first node; an address retrieving unit configured to retrieve the uncompressed IPv6 address of the compressed address; a packet converting unit configured to replace the compressed address in the packet with the uncompressed IPv6 address; a packet transmitting unit configured to transmit the packet including the uncompressed IPv6 address to a second node; and a mapping database that stores the IPv6 address and the compressed address, wherein the compressed address is generated by extracting a MAC address from the IPv6 address and inserting a previously defined bit sequence into the MAC address. The first node is a WPAN node.

Effect of the Invention

In accordance with the illustrative embodiment, it is possible to perform communications by using the 64-bit compressed address instead of the 128-bit IPv6 address. As a result, overhead can be reduced.

In accordance with the illustrative embodiment, the IPv6 address and the compressed address of the IPv6 address are stored in the mapping table. Thus, packet transmission using the same address can be performed without requiring any additional compression processes.

In accordance with the illustrative embodiment, through a header compression process, WPAN communication can be performed without including IPv6 address field in the IPv6 header.

BRIEF DESCRIPTION OF THE DRAWINGS

FIG. 10 is a diagram for illustrating a communication method using conversion of an IPv6 address in accordance with an illustrative embodiment of the present disclosure.

FIG. 11 is a block diagram illustrating a gateway in accordance with an illustrative embodiment of the present disclosure.

FIG. 12 is a diagram for illustrating a communication method using conversion of a compressed address in accordance with an illustrative embodiment of the present disclosure.

FIG. 13 is a block diagram illustrating a gateway in accordance with an illustrative embodiment of the present disclosure.

BEST MODE FOR CARRYING OUT THE INVENTION

Figure 1:
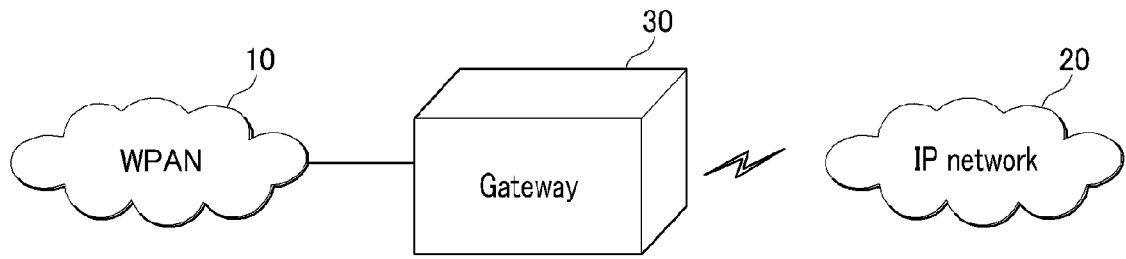
FIG. 1 is a conceptual diagram of a network in which 6LoWPAN is implemented in accordance with the prior art.

Hereinafter, illustrative embodiments of the present disclosure will be described in detail with reference to the accompanying drawings so that inventive concept may be readily implemented by those skilled in the art. However, it is to be noted that the present disclosure is not limited to the illustrative embodiments but can be realized in various other ways. In the drawings, certain parts not directly relevant to the description are omitted to enhance the clarity of the drawings, and like reference numerals denote like parts throughout the whole document.

Throughout the whole document, the terms "connected to" or "coupled to" are used to designate a connection or coupling of one element to another element and include both a case where an element is "directly connected or coupled to" another element and a case where an element is "electronically connected or coupled to" another element via still another element. Further, the term "comprises or includes" and/or "comprising or including" used in the document means that one or more other components, steps, operations, and/or the existence or addition of elements are not excluded in addition to the described components, steps, operations and/or elements.

Figure 2:
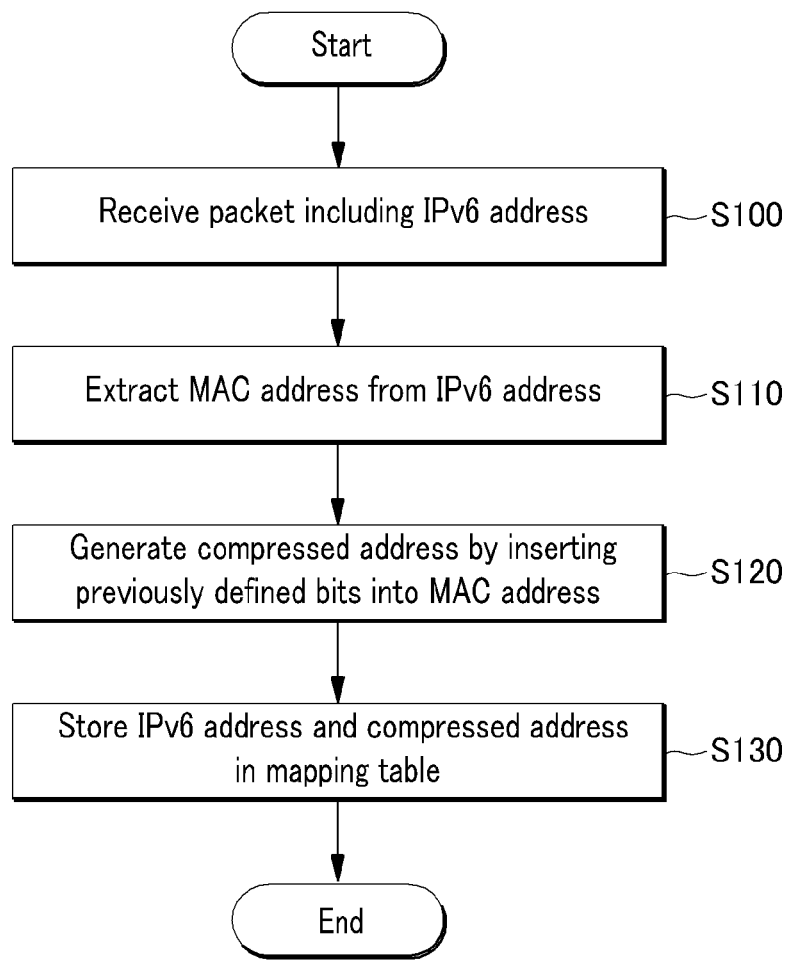
FIG. 2 is a flowchart for illustrating a method for compressing an IPv6 address in accordance with an illustrative embodiment of the present disclosure.
Figure 3:
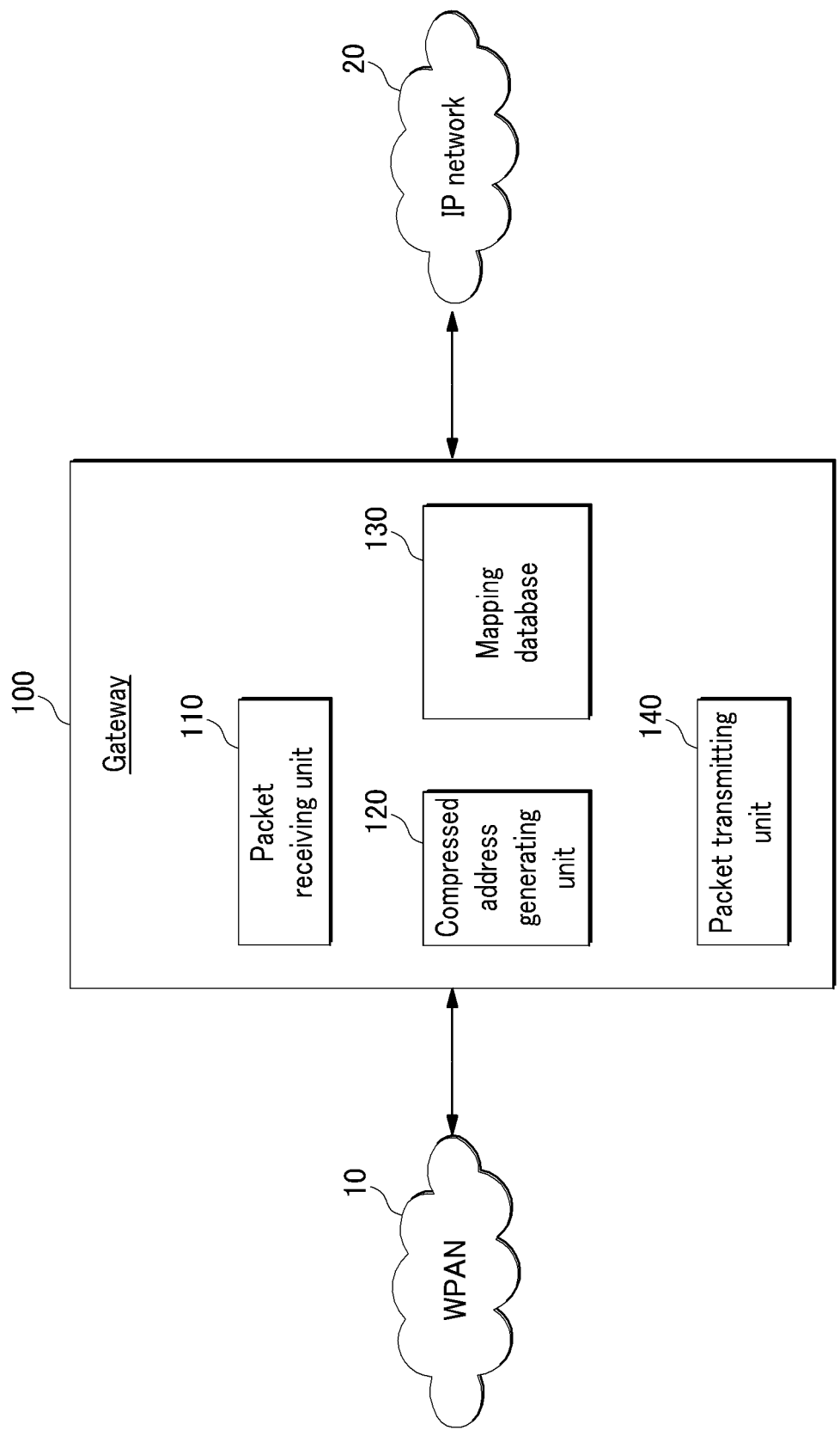
FIG. 3 is a block diagram illustrating a gateway in accordance with an illustrative embodiment of the present disclosure.
Figure 4:
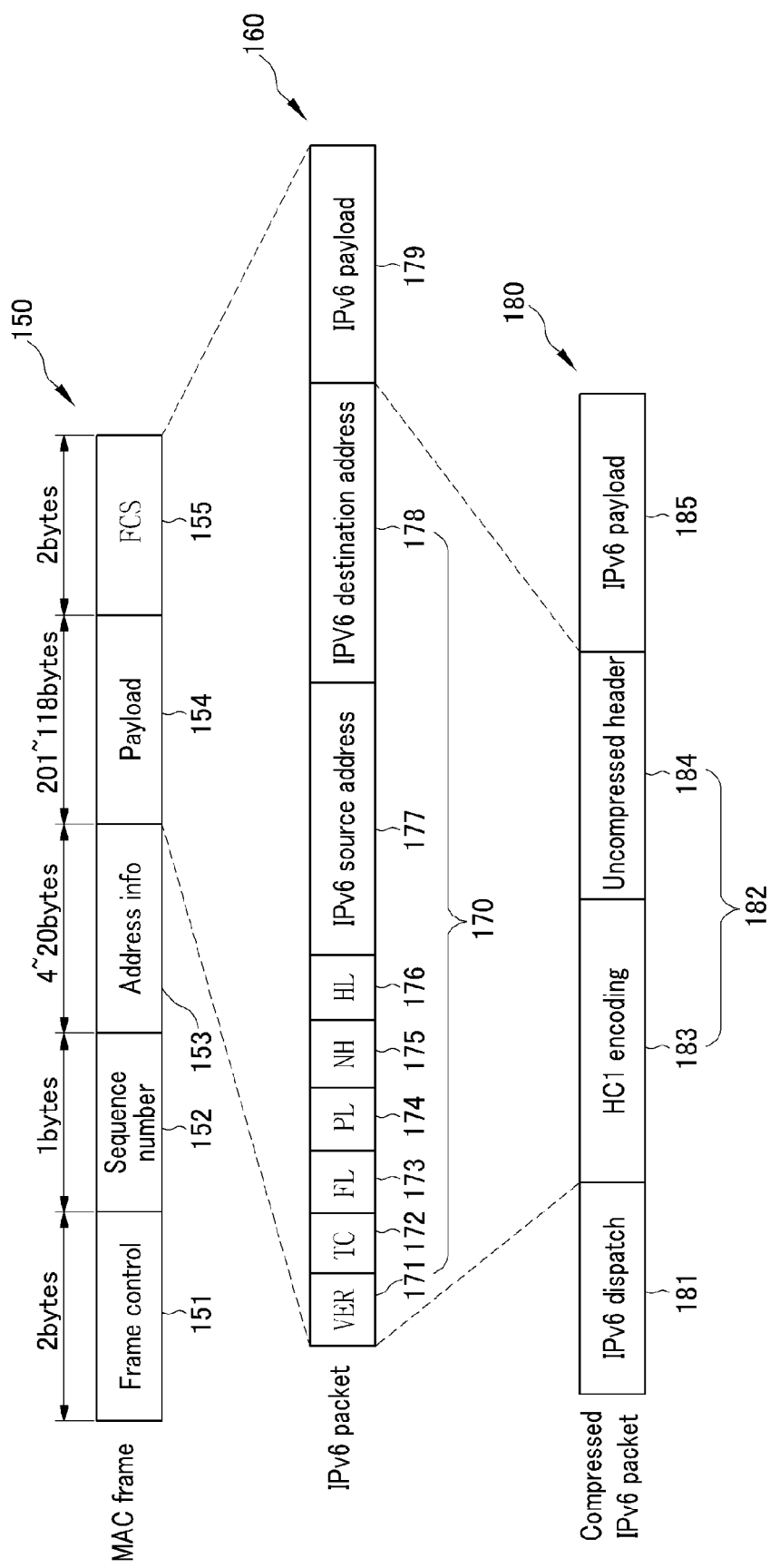
FIG. 4 is a configuration view illustrating a packet including an IPv6 address in accordance with an illustrative embodiment of the present disclosure.
Figure 5:
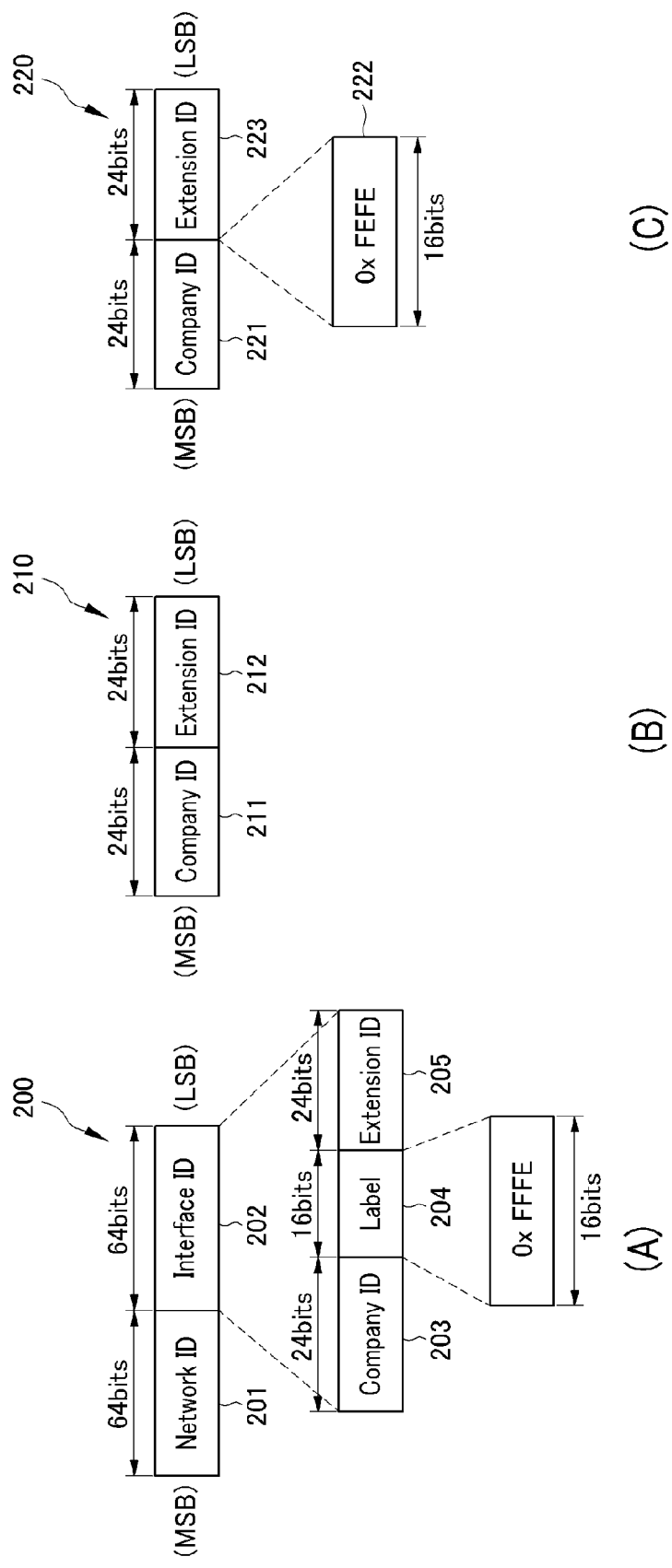
FIG. 5 is a diagram for describing a process of generating a compressed address of an IPv6 address in accordance with an illustrative embodiment of the present disclosure.
Figure 6:
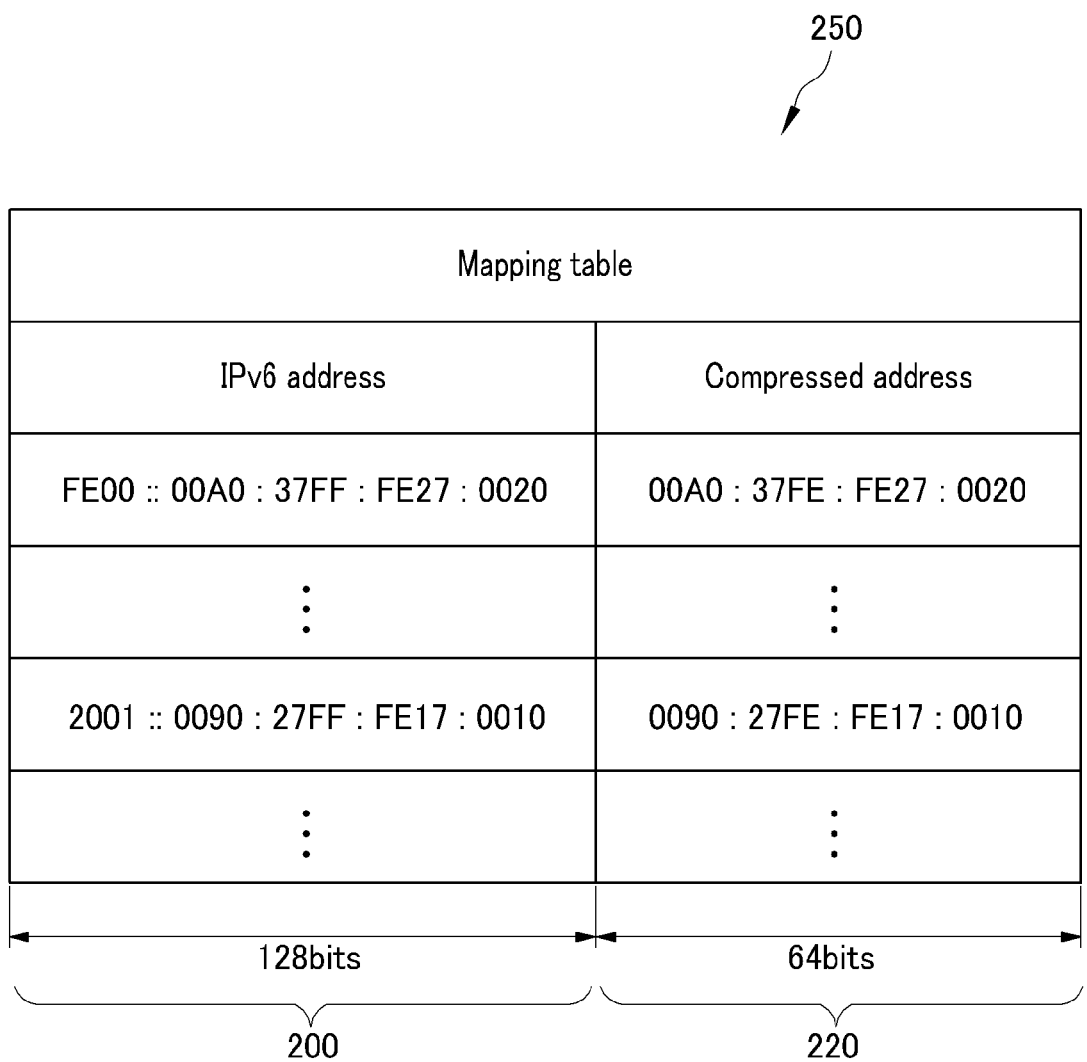
FIG. 6 is a diagram illustrating a mapping table in accordance with an illustrative embodiment of the present disclosure.

FIG. 2 is a flowchart for describing an IPv6 address compression method in accordance with an illustrative embodiment. FIG. 3 is a block diagram illustrating a gateway in accordance with an illustrative embodiment. FIG. 4 is a configuration view illustrating a packet in which an IPv6 address is included in accordance with an illustrative embodiment. FIG. 5 is a diagram for describing a process of generating a compressed address of an IPv6 address in accordance with an illustrative embodiment. FIG. 6 illustrates a mapping table in accordance with an illustrative embodiment.

The IPv6 address compression method may be used in a gateway 100. The gateway 100 may be provided at a connection point between networks in order to provide inter-operability between the networks. The gateway 100 can provide functions of compressing and restoring a packet. In particular, the IPv6 address compression method in accordance with the illustrative embodiment may be used in the gateway 100 that connects a WPAN and an IP network.

Specific steps of the IPv6 address compression method in FIG. 2 will be described in detail with reference to FIGS. 3 to 6. As illustrated in FIG. 3, the IPv6 address compression method may be performed by the gateway 100 connecting the WPAN and the IP network.

First, a packet including an IPv6 address is received (S100). The packet is a transmitting unit of data split to be easily transmitted across a network. The packet includes not only the data information but also address information, sequence information, error information, and so. The packet may have a standardized format depending on a protocol of the network.

By way of example, the packet may be received by a packet receiving unit 110 from an IP network 20. In this case, the received packet may be an IPv6 packet 160 as illustrated in FIG. 4. The IPv6 Packet 160 can be inserted into a payload 154 of an MAC frame 150 and includes an IPv6 header 170 and an IPv6 payload 179. The IPv6 header 170 includes a 4-bit VER (Version) 171 indicating a version of the Internet protocol; a 8-bit TC (Traffic Class) 172 indicating a service type; a 20-bit FL (Flow Label) 173 for discriminating a flow of the IPv6 packet; a 16-bit PL (Payload Length) 174 indicating a length of the IPv6 payload; a 8-bit NH (Next Header) 175 for instructing an extension header; a 8-bit HL (Hop Limit) 176 which is similar to TTL (Time To Live) of IPv4; a 128-bit IPv6 source address 177; and a 128-bit IPv6 destination address 178. The packet includes two IPv6 addresses, i.e., the IPv6 source address 177 and the IPv6 destination address 178.

The packet may be received by the packet receiving unit 110 from the WPAN 10. In this case, the received packet may be a compressed IPv6 packet 180 as illustrated in FIG. 4. The compressed IPv6 packet 180 may have been generated by compressing the IPv6 packet 160. In consideration of the maximum size of information unit used by PHY/MAC in the WPAN, which adopts IEEE 802.15.4 as the PHY/MAC, an IPv6/TCP or IPv6/UDP header and application data should be expressed within 80 bytes. In order to solve this problem, 6LoWPAN Working Group has proposed a method for compressing the header 170 of the IPv6 packet 160. For reference, RFC 4944, which is a standard document of 6LoWPAN, describes the compression of the header 170 of the IPv6 packet 160.

The compressed IPv6 packet 180 includes an 8-bit IPv6 dispatch 181 indicating a header type; a common compressed header 182; and an IPv6 payload 185. The common compressed header 182 includes 8-bit HC1 encoding 183 indicating compressed information; and a non-compressed header 184. In this case, the IPv6 address may be included in a part of the common compressed header 182, but not limited thereto. By way of example, the IPv6 address may be included in the IPv6 payload 185.

Meanwhile, Table 1 below provides a typical code pattern of the IPv6 dispatch 181.

TABLE 1

| Pattern | Header type | Remarks |
|---|---|---|
| 00 xxxxxx | NALP | Not a LoWPAN frame |
| 01 000001 | IPv6 | Non-compressed IPv6 address |
| 01 000010 | LoWPAN_HC1 | LoWPAN_HC1 compressed IPv6 |
| ... | Reserved | Currently reserved |
| 01 010000 | LoWPAN_BC0 | LoWPAN_BC0 broadcast |
| ... | Reserved | Currently reserved |
| 01 111111 | ESC | Accompanying an additional dispatch byte |

The packet including the IPv6 address in accordance with the illustrative embodiment may have a previously defined IPv6 dispatch value 181 in order to proceed to an IPv6 address compression. For example, the previously defined IPv6 dispatch value 181 may be '01010001,' but not limited thereto. The previously defined IPv6 dispatch value 181 may be any value currently reserved in Table 1.

Next, an MAC address is extracted from the IPv6 address (S110).

As illustrated in FIG. 5, an IPv6 address 200 includes a 64-bit network ID 201 and a 64-bit interface ID 202. Upper 64 bits of the IPv6 address 200 represents the network ID 201 and determined by a prefix allocated to each network. In general, in case of generating a global address, the upper 64 bits are automatically generated by network equipment, e.g., a router. Lower 64 bits of the IPv6 address 200 represents the interface ID 202 and are composed by using a 48-bit media access control (MAC) address of each device. A unique 64-bit ID for each device is generated by using an extended unique identifier (EUI)-64 format method. The upper 64-bit network ID 201 and the lower 64-bit interface ID 202, which have been generated as described above, are combined with each other, so that a unique 128-bit IPv6 address 200 of each device is generated.

Meanwhile, when generating the interface ID 202 by using the EUI-64 format method, the interface ID 202 includes a label (0xFFFE) 204 composed of 16 bits between a company ID 203 of upper 24 bits and an extension ID 205 of lower 24 bits. The company ID 203 is a value indicating a manufacturing company of the device and is allocated from IEEE. The extension ID 205 indicates a serial number of the device using the MAC address.

As illustrated in FIG. 5, the MAC address 210 includes a 24-bit company ID 211 and a 24-bit extension ID 212. The MAC address 210 may be extracted and generated from the IPv6 address 200. For example, the MAC address 210 may be generated through the steps of extracting the interface ID 202 from the IPv6 address 200, extracting the company ID 203 and the extension ID 205 from the interface ID 202, and then combining these extracts. However, the way to generate the MAC address 210 may not be limited thereto. By way of example, the MAC address 210 may be generated by removing the network ID 201 and the label 204 from the IPv6 address 200.

Next, a compressed address is generated by inserting a previously defined bit sequence into the MAC address (S120).

As illustrated in FIG. 5, the compressed address 220 includes a 24-bit company ID 221, a previously defined bit sequence 222 and a 24-bit extension ID 222. The compressed address of the IPv6 address 200 may be generated by inserting the previously defined bit sequence 222 into the MAC address

210. For example, the compressed address 220 may be generated by inserting the previously defined bit sequence 222 between the company ID 211 and the extension ID 212 of the MAC address 210. The previously defined bit sequence 222 may be an arbitrary 16-bit value, e.g., 0xFEFE (1111 1110 1111 1110). The generated compressed address 220 of the IPv6 address 200 has 64 bits, which is equivalent to a half the size of the 128-bit IPv6 address 200.

In the present illustrative embodiment, 0xFEFE has been described as an example of the previously defined bit sequence 222. However, the previously defined bit sequence 222 may not be limited thereto and may have another value.

The step of generating the compressed address 220 by extracting the MAC address 210 from the IPv6 address 200 and inserting the previously defined bit sequence 222 into the MAC address 210 may be performed by the compressed address generating unit 120 of the gateway 100.

Next, the IPv6 address and the compressed address are stored in a mapping table (S130).

As illustrated in FIG. 6, a mapping table 250 in a mapping database 130 includes the IPv6 address 200 and the compressed address 220. The IPv6 address 200 and the compressed address 220 corresponding thereto may be stored in the mapping tale 250. Although the data of the mapping table 250 is shown to be defined by hexadecimal notation, they may be actually stored in binary numbers.

When the previously defined bit sequence is '0xFEFE (1111 1110 1111 1110)' and the IPv6 address 200 is 'FE00:: 00 A0:37 FF:FE27:0020,' the compressed address 220 corresponding thereto may become '00A0:37 FE:FE27:0020' through the extraction of the MAC address and the insertion of the previously defined bit sequence. The mark '::' in the IPv6 address 200 refers to omission of consecutive 0 bits. 'FE00::00 A0:37 FF:FE27:0020' and '00A0:37 FE:FE27: 0020' are stored in the mapping table 250 in a way of being corresponded to each other.

As illustrated in FIG. 3, all the data in the mapping table 250 may be stored in the mapping database 130. The mapping database 130 may be a hardware implementation of the mapping table 250.

An IPv6 address management method in accordance with the illustrative embodiment involves compressing the 128-bit IPv6 address 200 to the 64-bit compressed address 220 and storing the 64-bit compressed address 220 in the mapping tale 250. By using the IPv6 address 200 and the compressed address 220, which are stored in the mapping table 250, a conversion of the IPv6 address 200 can be performed. This conversion process will be described below in detail.

Figure 7:
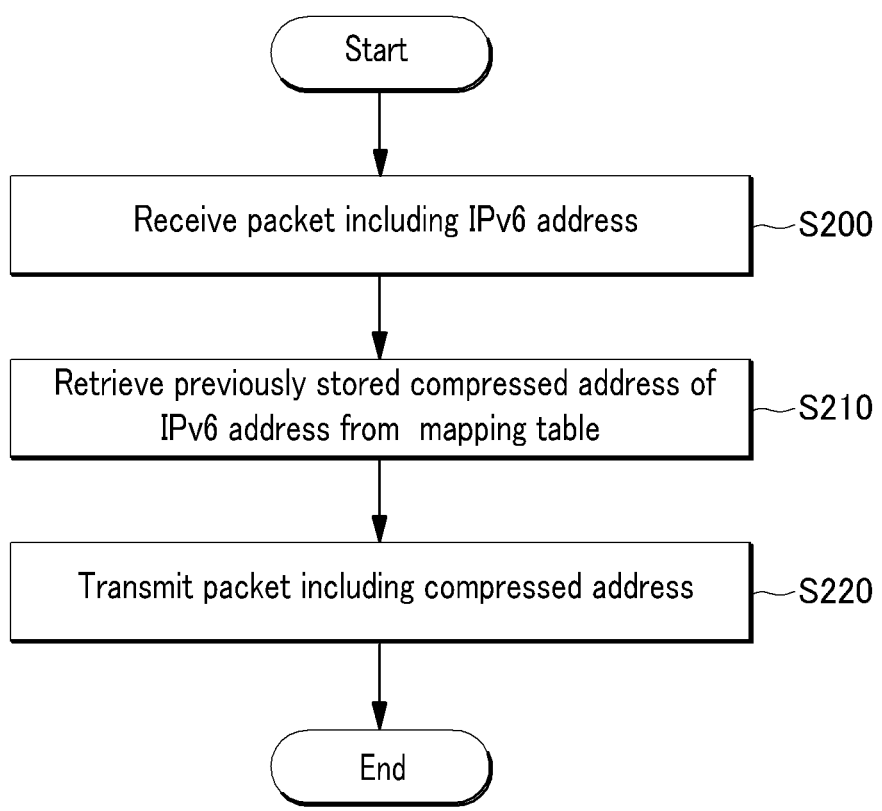
FIG. 7 is a flowchart for describing a method for converting an IPv6 address in accordance with an illustrative embodiment of the present disclosure.
Figure 8:
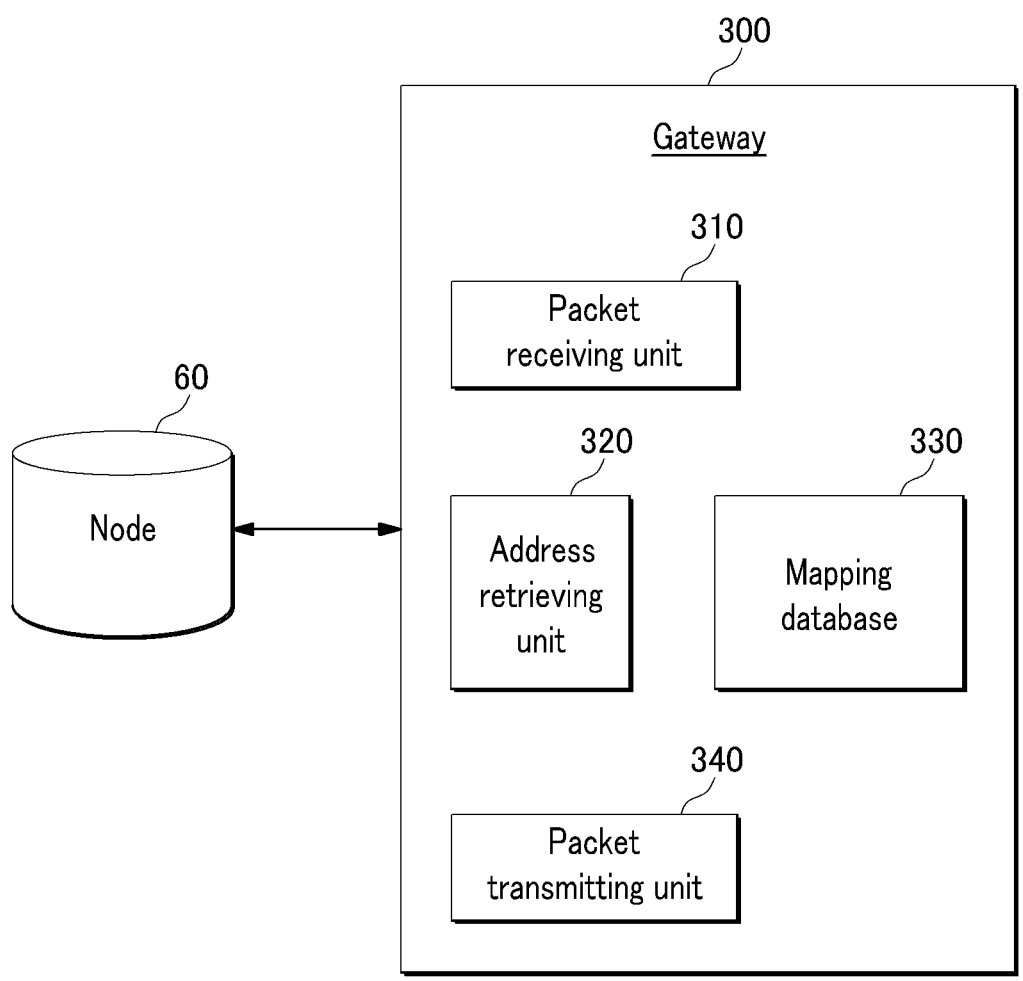
FIG. 8 is a block diagram illustrating a gateway in accordance with an illustrative embodiment of the present disclosure.
Figure 9:
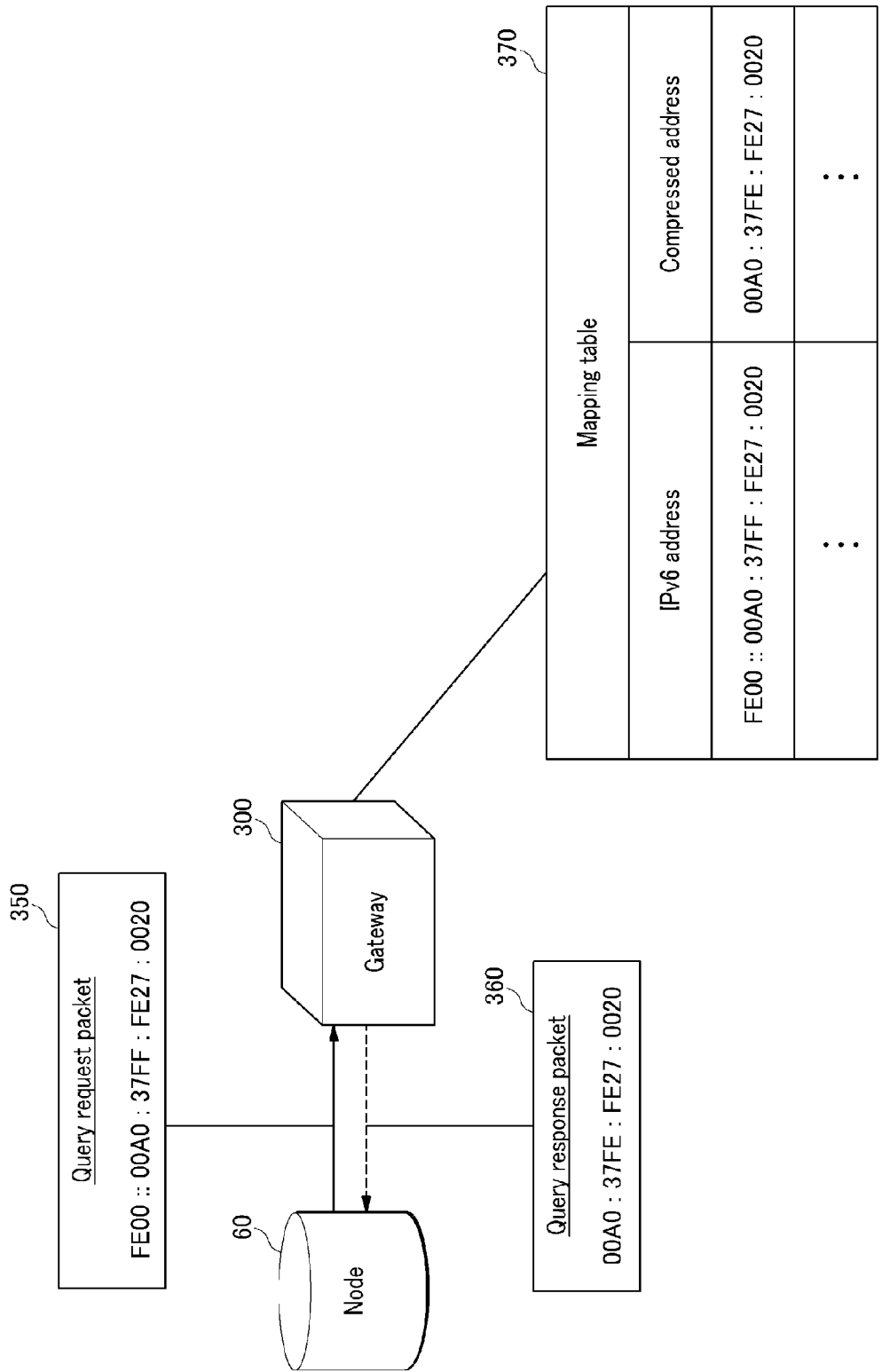
FIG. 9 is a diagram for describing a process of converting an IPv6 address in accordance with an illustrative embodiment of the present disclosure.

FIG. 7 is a flowchart for describing a conversion method for an IPv6 address in accordance with an illustrative embodiment of the present disclosure. FIG. 8 is a block diagram illustrating a gateway in accordance with an illustrative embodiment, and FIG. 9 is a diagram for explaining a process of converting the IPv6 address in accordance with an illustrative embodiment of the present disclosure.

The conversion method for an IPv6 address is comprised of receiving a packet including an IPv6 address, retrieving a compressed address of the IPv6 address from the mapping table and transmitting a packet that includes the compressed address. In particular, the compressed address in accordance with an illustrative embodiment of the present disclosure may have been generated by extracting a MAC address from the IPv6 address and inserting a previously defined bit sequence into the MAC address. By providing a 64-bit compressed address corresponding to the 128-bit IPv6 address, network communication can be performing using a smaller-sized address value.

Specific steps of the IPv6 address conversion method in accordance with FIG. 7 will be described in detail with reference to FIGS. 8 and 9. Here, the respective steps of the IPv6 address conversion method in accordance with FIG. 8 may be performed by a gateway 300 illustrated in FIG. 9.

First, a packet including an IPv6 address is received (S200).

Referring to FIGS. 8 and 9, a packet receiving unit 310 of the gateway 300 receives a packet including an IPv6 address, e.g., a query request packet 350 from a node 60. The node 60 may be a WPAN node. In this case, since the query request packet 350 is transmitted from the WPAN node, it may have a compressed IPv6 packet format. The compressed IPv6 packet format has been described above with reference to FIG. 4. The IPv6 address may be included in a common compressed header of the query request packet 350, but not limited thereto. By way of example, the IPv6 address may be included in an IPv6 payload. The query request packet 350 may have a previously defined IPv6 dispatch value in order to proceed to the conversion of the IPv6 address. By way of example, the previously defined IPv6 dispatch value may be, but not limited to, '01010001.' The previously defined IPv6 dispatch value may be any other currently reserved value.

To transmit data to an external IP network node, the WPAN node may transmit, to the gateway 300, a packet including an IP network node address of the destination node. The destination address is a 128-bit IPv6 address, and, for example, may be 'FE00::00 A0:37 FF:FE27:0020.'

In the present illustrative embodiment, the node 60 is described as the WPAN node, but not limited thereto. The node 30 may be a node on a different kind network that complies with the IEEE 802.15.4 standard, or may be an IP network node. In case that the node 60 is an IP network node, the IP network node may transmit, to the gateway 300, a packet including an address of a destination WPAN node in the form of IPv6 in order to transmit data to the WPAN node.

In the present illustrative embodiment, the query request packet 350 is described as an example of the packet including the IPv6 address, but the packet including the IPv6 address is not limited thereto. That is, any packet including the IPv6 address may be used. In the present illustrative embodiment, the destination address is described as an example of the IPv6 address, but the IPv6 address is not limited thereto. That is, the IPv6 address may be a source address or any other kind of address. Further, in the present illustrative embodiment, the packet includes one IPv6 address, but the number of IPv6 addresses included in the packet is not limited thereto. The packet may include more than one IPv6 addresses.

Next, the compressed address of the IPv6 address is retrieved from the previously defined mapping table (S210).

The mapping table 370 in the mapping database 330 stores at least one IPv6 address and a compressed address thereof. Since the IPv6 address and the compressed address corresponding thereto are stored together in the mapping table 370, an address retrieving unit 320 of the gateway 300 can retrieve the compressed address corresponding to the IPv6 address included in the received packet. As stated above, the compressed address of the IPv6 address may have been generated by extracting the MAC address from the IPv6 address and inserting a previously defined bit sequence into the MAC address. Since the mapping table 370 and the IPv6 compressed address have been described above, detailed description thereof will be omitted here.

As illustrated in FIG. 8, all the data in the mapping table 370 may be stored in the mapping database 330. The mapping database 330 may be a hardware implementation of the mapping tale 370.

If the previously defined bit sequence is '0xFEFE(1111 1110 1111 1110)' and the IPv6 address included in the received packet is 'FE00::00 A0:37 FF;FE27:0020,' the compressed address becomes '00A0:37 FE:FE27:0020.' The address retrieving unit 320 of the gateway 300 retrieves '00A0:37 FE:FE27:0020' from the mapping table 370.

Next, a packet including the compressed address is transmitted (S220).

Referring to FIGS. 8 and 9, the packet transmitting unit 340 of the gateway 300 transmits a packet including the compressed address, e.g., a query response packet 360, to the node 60. The node 60 to which the query response packet 360 is transmitted may be the same as the node 60 which has transmitted the packet including the IPv6 address. If the node 60 is a WPAN node, the query response packet 360 to be transmitted to the node 60 may have a compressed IPv6 packet format. The compressed IPv6 packet format has been described above with reference to FIG. 4. In this case, the compressed address may be included in a part of a common compressed header within the query response packet 360 but is not limited thereto. The compressed address may be included in an IPv6 payload. The query response packet 360 is a response packet to the query request packet 350 and may have a previously defined IPv6 dispatch value indicating that this packet is the response packet to the query request packet 350. For example, the previously defined IPv6 dispatch value may be '01010010' but is not limited thereto. The previously defined IPv6 dispatch value may be any other currently reserved value.

As illustrated in FIG. 9, the query response packet 360 includes the compressed address '00A0:37 FE:FE27:0020' retrieved from the mapping table 370. The compressed address is a compressed form of the IPv6 address 'FE00::00 A0:37 FF;FE27:0020' included in the query request packet.

FIG. 10 illustrates a communication method using the IPv6 address conversion in accordance with an illustrative embodiment of the present disclosure. FIG. 11 is a block diagram illustrating a gateway in accordance with an illustrative embodiment.

The communication method using the IPv6 address conversion is comprised of receiving a packet including an IPv6 address from a first node, retrieving a compressed address of the IPv6 address from a previously stored mapping table, replacing the IPv6 address with the retrieved compressed address and transmitting a packet including the compressed address to a second node. In particular, as stated above, the compressed address in accordance with the illustrative embodiment is generated by extracting an MAC address from the IPv6 address and inserting a previously defined bit sequence into a MAC address. By providing a 64-bit compressed address corresponding to the 128-bit IPv6 address, network communication can be performed using a smaller sized address value.

When data is transmitted to the IPv6 address of which compressed address is stored in the mapping table, an additional compression process for the IPv6 address is not required.

Specific steps of the communication method in accordance with FIG. 10 will be described in detail with reference to FIG. 11. The respective steps of the communication method in accordance with FIG. 10 may be performed by the gateway 400 illustrated in FIG. 11.

First, a packet including an IPv6 address is received from the first node (S300).

Referring to FIG. 11, a packet receiving unit 410 of a gateway 400 receives a packet 460 from a first node 70. The received packet 460 includes an IPv6 address which includes a destination address d1 and a source address s1. The first node 70 may be an IP network node. In this case, the packet 460 may have an IPv6 packet format. The IPv6 packet format has been described above with reference to FIG. 4. The destination address d1 and the source address s1 are transmitted to the gateway 400 after being included in a header of the IPv6 packet. In this case, the first node 70 may be included in the IP network, and the gateway 400 may connect the IP network and a WPAN.

In the present illustrative embodiment, although the packet 460 including the destination address d1 and the source address s1 is described as an example of the packet including the IPv6 address, the illustrative embodiment is not limited thereto. Any packet including the IPv6 address may be used. Further, in the present illustrative embodiment, the packet 460 includes the two IPv6 addresses, but not limited thereto. By way of example, the packet 460 may include one or more than two IPv6 addresses. In the present illustrative embodiment, although the destination address d1 and the source address s1 are described as an example of information included in the header of the packet, the illustrative embodiment may not be limited thereto. By way of example, the destination address d1 and the source address s1 may be included in a payload of the packet.

Next, the compressed address of the IPv6 address is retrieved from the mapping table.

The mapping table in the mapping database 440 stores at least one IPv6 address and a compressed address of the IPv6 address. Since the IPv6 address and the compressed address corresponding thereto are stored in the mapping table together, the address retrieving unit 420 of the gateway 400 can retrieve the compressed address of the IPv6 address included in the received packet. As described above, the compressed address of the IPv6 address is generated by extracting a MAC address from the IPv6 address and inserting a previously defined bit sequence into the MAC address. Since the mapping table and the compressed address of IPv6 have been described above, detailed description thereof will be omitted here.

As illustrated in FIG. 11, all the data in the mapping table may be stored in a mapping database 440. The mapping database 440 may be a hardware implementation of the mapping table.

Referring to FIG. 11, since the received packet 460 includes two IPv6 addresses—the destination address d1 and the source address s1—the address retrieving unit 420 retrieves two compressed addresses corresponding to these two addresses d1 and s1 respectively.

Next, the IPv6 address is replaced with the compressed address (S320).

A packet converting unit 430 of the gateway 400 replaces the IPv6 address included in the packet 460 received by the packet receiving unit 410 with the compressed address retrieved from the mapping table.

Referring to FIG. 11, the two IPv6 addresses included in the packet 460, i.e., the destination address d1 and the source address s1, may be replaced with a compressed address cd1 and a compressed address cs1, respectively, that are retrieved from the mapping table.

In the present illustrative embodiment, the term 'replace' is used. But the term 'replace' is not limited to replacing the address part while preserving the frame or field part of the packet 460. Here, the term 'replace' means that the IPv6 address of the packet 460 is removed and a compressed address thereof is newly included independently of the conversion of the frame or the field part.

Next, a packet including the compressed address is transmitted to a second node (S330).

The packet converting unit 430 outputs a packet 470 including the compressed address of the IPv6 address. The packet 470, which includes the compressed address cd1 of the destination address and the compressed address cs1 of the source address, is transmitted to a second node 75 by the packet transmitting unit. The second node 75 may be, for example, a WPAN node.

The communication method in accordance with the illustrative embodiment of the present disclosure transmits the packet 470 of which IPv6 address is replaced with the compressed address thereof. As a result, communications after the packet passes the gateway 400, for example, communications in the network to which the second node 75 belongs, can advantageously be performed by using the simpler compressed address.

In accordance with the communication method of the illustrative embodiment, through converting the IPv6 address and compressing the header, communication in a WPAN can be performed without needing to include the IPv6 address field in the IPv6 header.

FIG. 12 illustrates a communication method using conversion of a compressed address in accordance with an illustrative embodiment of the present disclosure. FIG. 13 is a block diagram illustrating a gateway in accordance with the illustrative embodiment.

The communication method using conversion of a compressed address involves receiving a packet including a compressed address of an IPv6 address from a first node, retrieving the previously stored non-compressed IPv6 address of the compressed address from the mapping table, replacing the compressed address with the retrieved IPv6 address, and transmitting a packet including the IPv6 address to a second node. In particular, as described above, the compressed address in accordance with the illustrative embodiment of the present disclosure is generated by extracting an MAC address from the IPv6 address and inserting a previously defined bit sequence into the MAC address. By using a 64-bit compressed address, instead of a 128-bit IPv6 address for communication packet transmission overhead can be reduced.

Specific steps of the communication method in accordance with FIG. 12 will be described in detail with reference to FIG. 13. The respective steps of the communication method in accordance with FIG. 12 may be performed by a gateway 500 illustrated in FIG. 13.

First, a packet including a compressed address of an IPv6 address is received from the first node (S400).

Referring to FIG. 13, a packet receiving unit 510 of the gateway 500 receives a packet 560 from the first node 80. The received packet 560 includes a compressed address of an IPv6 address. The compressed address includes a compressed destination address cd2 and a compressed source address cs2. The first node 80 may be a WPAN node. The compressed destination address cd2 and the compressed source address cs2 are transmitted to the gateway 500 after being included in the packet. The gateway 500 may connect the WPAN with an IP network.

In the present illustrative embodiment, the packet including the compressed destination address cd2 and the compressed source address cd2 is described as an example of the packet 560. However, the illustrative embodiment may not be limited thereto, and the packet 560 may be any packet including a compressed address. Further, in the present illustrative embodiment, although the packet 560 is described to include two compressed addresses, the illustrative embodiment may not be limited thereto. The packet 560 may include one or more than two compressed addresses.

Next, the uncompressed IPv6 address corresponding to the compressed address is retrieved from a mapping tale (S410).

The mapping table in a mapping database 540 stores at least one IPv6 address and a compressed address corresponding to the IPv6 address. Since the IPv6 address and the compressed address corresponding thereto are stored in the mapping table together, an address retrieving unit 520 of the gateway 500 can retrieve the uncompressed IPv6 address of the compressed address that is included in the received packet 560. The compressed address of the IPv6 address is generated by extracting an MAC address from the IPv6 address and inserting a previously defined bit sequence into the MAC address, as described above. Since the mapping tale and the compressed address of IPv6 have been described above, detailed descriptions thereof will be omitted here.

As illustrated in FIG. 13, all the data in the mapping table may be stored in the mapping database 540. The mapping database 540 may be a hardware implementation of the mapping tale.

Referring to FIG. 13, since the compressed address included in the received packet includes two compressed address—a compressed destination address cd2 and a compressed source address cs2—the address retrieving unit 420 retrieves two IPv6 addresses corresponding to the two compressed addresses respectively.

Next, the compressed address is replaced with the uncompressed IPv6 address (S420).

The packet converting unit 430 replaces the compressed address included in the packet 560 with the address retrieved by the address retrieving unit 520.

Referring to FIG. 13, the two compressed addresses included in the packet 560, i.e., the compressed destination address cd2 and the compressed source address cs2 are replaced with the destination address d2 and the source address s2 retrieved from the mapping tale.

In the present illustrative embodiment, the term 'replace' is used. The term 'replace' is not limited to replacing the address part while preserving the frame or field part of the packet 560. Here, the term 'replace' means that the IPv6 address of the packet 560 is removed and a compressed address thereof is newly included independently of the conversion of the frame or the field part.

Next, a packet including the IPv6 address is transmitted to the second node (S430).

The packet converting unit 530 outputs a packet including the IPv6 address, i.e., the destination address d2 and the source address s2. The packet transmitting unit 550 transmits the packet 570 including the IPv6 address to the second node. The second node may be, for example, a node of an IP network.

In a communication method in accordance with an illustrative embodiment of the present disclosure, the packet 570, in which the compressed address is replaced with the IPv6 address, is transmitted. As a result, communication at a node before the packet is transmitted to the gateway 500, e.g., communication in a network to which the first node 80 belongs, may be conducted by using a simpler compressed address.

Also, now that the compressed address of the IPv6 address is stored in the mapping table, when the packet including the IPv6 address is received, any additional IPv6 address compression process is not accompanied.

The node 80 may be implemented as a sensor node, a computer or a mobile terminal that is capable of accessing a network. The sensor node includes all types of devices capable of collecting information and transmitting the collected information by using a sensor. The computer may include, but not limited to, a desktop, a laptop, and the like that is equipped with a Web Browser. The mobile terminal refers to a wireless communication device having portability and mobility and may include all types of handheld wireless communication devices such as PCS (Personal Communication System), GSM (Global System for Mobile communications), PDC (Personal Digital Cellular), PHS (Personal Handyphone System), PDA (Personal Digital Assistant), IMT (International Mobile Telecommunication)-2000, CDMA (Code Division Multiple Access)-2000, W-CDMA (W-Code Division Multiple Access), and Wibro (Wireless Broadband Internet) terminal.

Each of components illustrated in FIGS. 3, 8, 9, 11 and 13 in accordance with the embodiments of the present disclosure may be a software or a hardware component such as a field programmable gate array (FPGA) or an application specific integrated circuit (ASIC). These components are configured to carry out certain functions.

However, the components are not limited to the software or the hardware, and each of the components may be stored in an addressable storage medium or may be configured to implement one or more processors.

Accordingly, the components may include, for example, software, object-oriented software, classes, tasks, processes, functions, attributes, procedures, sub-routines, segments of program codes, drivers, firmware, micro codes, circuits, data, database, data structures, tables, arrays, variables and the like.

The components and functions thereof can be combined with each other or can be divided into additional components.

The above description of the illustrative embodiments is provided for the purpose of illustration, and it would be understood by those skilled in the art that various changes and modifications may be made without changing technical conception and essential features of the illustrative embodiments. Thus, it is clear that the above-described illustrative embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the illustrative embodiments. It shall be understood that all modifications and embodiments conceived from the meaning and scope of the claims and their equivalents are included in the scope of the inventive concept.

What is claimed is:

1. A management method for an IPv6 address for use in a gateway, the method comprising:
    receiving a packet including an IPv6 address, wherein the IPv6 address includes a network ID and an interface ID, the interface ID includes a company ID, a label, and an extension ID;
    generating a MAC address from the IPv6 address of the packet by removing the network ID and the label from the IPv6 address;
    generating a compressed address by inserting a previously defined bit sequence between the company ID and the extension ID of the MAC address; and
    storing the compressed address and the IPv6 address in a mapping table,
    wherein the packet is received from a WPAN (Wireless Personal Area Network) node.

2. The management method of claim 1, wherein the MAC address has 48 bits, the previously defined bit sequence has 16 bits.

3. The management method of claim 1, wherein the previously defined bit sequence is 0xFEFE (1111111011111110).

4. The management method of claim 1, wherein the gateway connects a WPAN and an IP network.

5. A management method for an IPv6 address for use in a gateway, the method comprising:
    receiving a packet including an IPv6 address from a node, wherein the IPv6 address includes a network ID and an interface ID, the interface ID includes a company ID, a label, and an extension ID;
    retrieving a compressed address of the IPv6 address from a previously stored mapping table; and
    transmitting a packet including the compressed address to the node,
    wherein the compressed address is generated by removing the network ID and the label from the IPv6 address and inserting a previously defined bit sequence between the company ID and the extension ID of the IPv6 address,
    and the packet is received from a WPAN (Wireless Personal Area Network) node.

6. A management method for an IPv6 address for use in a gateway, the method comprising:
    receiving a packet including an IPv6 address from a first node, wherein the IPv6 address includes a network ID and an interface ID, the interface ID includes a company ID, a label, and an extension ID;
    retrieving a compressed address of the IPv6 address from a previously stored mapping table;
    replacing the IPv6 address in the packet with the compressed address; and
    transmitting the packet including the compressed address to a second node,
    wherein the compressed address is generated by removing the network ID and the label from the IPv6 address and inserting a previously defined bit sequence between the company ID and the extension ID of the IPv6 address,
    and the second node is a WPAN node.

7. A management method for an IPv6 address for use in a gateway, the method comprising:
    receiving a packet including a compressed address of an IPv6 address from a first node;
    retrieving, from a previously stored mapping table, the uncompressed IPv6 address of the compressed address, wherein the uncompressed IPv6 address includes a network ID and an interface ID, the interface ID includes a company ID, a label, and an extension ID;
    replacing the compressed address in the packet with the uncompressed IPv6 address; and
    transmitting the packet including the uncompressed IPv6 address to a second node,
    wherein the compressed address is generated by removing the network ID and the label from the uncompressed IPv6 address and inserting a previously defined bit sequence between the company ID and the extension ID,
    and the first node is a WPAN node.

8. A gateway comprising:
    a packet receiving unit configured to receive a packet including an IPv6 address, wherein the IPv6 address includes a network ID and an interface ID, the interface ID includes a company ID, a label, and an extension ID;
    a compressed address generating unit configured to extract a MAC address from the IPv6 address of the packet by removing the network ID and the label from the IPv6 address and generate a compressed address by inserting a previously defined bit sequence between the company ID and the extension ID of the MAC address; and a mapping database that stores the IPv6 address and the compressed address, wherein the packet receiving unit receives the packet from a WPAN (Wireless Personal Area Network) node.

9. The gateway of claim 8, wherein the MAC address has 48 bits, the previously defined bit sequence has 16 bits.

10. The gateway of claim 8, wherein the previously defined bit sequence is 0xFEFE (1111111011111110).

11. The gateway of claim 8, wherein the gateway connects a WPAN and an IP network.

12. A gateway comprising:
a packet receiving unit configured to receive a packet including an IPv6 address from a node, wherein the IPv6 address includes a network ID and an interface ID, the interface ID includes a company ID, a label, and an extension ID;

an address retrieving unit configured to retrieve a compressed address of the IPv6 address;

a packet transmitting unit configured to transmit a packet including the compressed address to the node; and a mapping database that stores the IPv6 address and the compressed address, wherein the compressed address is generated by removing the network ID and the label from the IPv6 address and inserting a previously defined bit sequence between the company ID and the extension ID of the IPv6 address, and the packet receiving unit receives the packet from a WPAN (Wireless Personal Area Network) node.

13. A gateway comprising:
a packet receiving unit configured to receive a packet including an IPv6 address from a first node, wherein the IPv6 address includes a network ID and an interface ID, the interface ID includes a company ID, a label, and an extension ID;

an address retrieving unit configured to retrieve a compressed address of the IPv6 address;

a packet converting unit configured replace the IPv6 address in the packet with the compressed address;

a packet transmitting unit configured to transmit the packet including the compressed address to a second node; and a mapping database that stores the IPv6 address and the compressed address, wherein the compressed address is generated by removing the network ID and the label from the IPv6 address and inserting a previously defined bit sequence between the company ID and the extension ID of the IPv6 address, and the second node is a WPAN node.

14. A gateway comprising:
a packet receiving unit configured to receive a packet including a compressed address of an IPv6 address from a first node;

an address retrieving unit configured to retrieve the uncompressed IPv6 address of the compressed address, wherein the uncompressed IPv6 address includes a network ID and an interface ID, the interface ID includes a company ID, a label, and an extension ID;

a packet converting unit configured to replace the compressed address in the packet with the uncompressed IPv6 address;

a packet transmitting unit configured to transmit the packet including the uncompressed IPv6 address to a second node; and a mapping database that stores the IPv6 address and the compressed address, wherein the compressed address is generated by removing the network ID and the label from the uncompressed IPv6 address and inserting a previously defined bit sequence between the company ID and the extension ID, and the first node is a WPAN node.

* * * * *